(12) United States Patent
Park

(10) Patent No.: US 8,887,887 B2
(45) Date of Patent: Nov. 18, 2014

(54) SYNCHRONIZING DEVICE FOR TRANSMISSION

(75) Inventor: Jongyun Park, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 116 days.

(21) Appl. No.: 13/471,268

(22) Filed: May 14, 2012

(65) Prior Publication Data

US 2012/0292152 A1 Nov. 22, 2012

(30) Foreign Application Priority Data

May 17, 2011 (KR) ........................ 10-2011-0046285

(51) Int. Cl.
*F16D 23/06* (2006.01)

(52) U.S. Cl.
USPC ........................................ 192/53.34; 192/53.3

(58) Field of Classification Search
CPC .............................................. F16D 2023/0618
USPC ............................... 192/53.36, 53.34, 53.341
See application file for complete search history.

(56) References Cited

U.S. PATENT DOCUMENTS

| | | | | |
|---|---|---|---|---|
| 4,475,639 A | * | 10/1984 | Tausend | 192/53.362 |
| 5,425,437 A | * | 6/1995 | Nellums | 192/53.3 |
| 5,544,727 A | * | 8/1996 | Braun | 192/48.91 |

FOREIGN PATENT DOCUMENTS

| | | |
|---|---|---|
| JP | 05-223128 A | 8/1993 |
| JP | 11-210778 A | 8/1999 |
| JP | 3242460 B2 | 10/2001 |
| JP | 2012-057786 A | 3/2012 |
| KR | 1998-018265 U | 7/1998 |
| KR | 2002-0089946 A | 11/2002 |

* cited by examiner

*Primary Examiner* — Gene Crawford
*Assistant Examiner* — Mark Manley
(74) *Attorney, Agent, or Firm* — Morgan, Lewis & Bockius LLP

(57) ABSTRACT

A synchronizing device for a transmission may include a clutch hub splined on a rotation shaft, a sleeve engaged to an external circumferential portion of the clutch hub by interposing a blocking key therebetween, the sleeve being movable axially, a clutch gear having a cone surface and disposed at both sides of the sleeve without an interference with the rotation shaft, and a blocker ring disposed between the clutch hub and the clutch gear and frictionally engaged to the cone surface of the clutch gear, wherein the blocker ring includes a servo load exerted portion and a key load exerted portion disposed alternately in a circumferential direction of the blocker ring and respectively having a key contacting surface, and the key contacting surface of the servo load exerted portion may be disposed axially apart from the key contacting surface of the key load exerted portion by a predetermined distance.

9 Claims, 11 Drawing Sheets

SYNCHRONIZING DEVICE FOR TRANSMISSION

CROSS-REFERENCE TO RELATED APPLICATION

The present application claims priority to Korean Patent Application No. 10-2011-0046285 filed in the Korean Intellectual Property Office on May 17, 2011, the entire contents of which is incorporated herein for all purposes by this reference.

BACKGROUND OF THE INVENTION

1. Field of the Invention

The present invention relates to a transmission used in a vehicle. More particularly, the present invention relates to a synchronizing device for a manual transmission that performs synchronizing action smoothly by eliminating an oil film from a blocker ring and a cone surface of a clutch gear during only key load is exerted when synchronizing.

2. Description of Related Art

Generally, a transmission is a part of a power delivery device. The transmission is disposed between a clutch and a drive shaft so as to increase or decrease engine torque according to a driving condition of a vehicle. In addition, the transmission has a reverse device for reversing the vehicle.

A synchronizing device of a manual transmission prevents shift shock through a smooth connection of gears by engaging a driving gear with a driven gear after rotation speeds of the driving and drive gears are synchronized when the driving gear is engaged with the driven gear.

FIG. 1 is a partial cross-sectional view of a conventional synchronizing device.

Referring to FIG. 1, a conventional synchronizing device includes a clutch hub 100, a sleeve 102, a blocking key 104, a blocker ring 106, and a clutch gear 108.

The clutch hub 100 is splined to a rotation shaft (not shown), and a plurality of recesses is formed at an exterior circumference thereof along a circumferential direction with even distances.

The sleeve 102 is splined to the exterior circumference of the clutch hub 100 and is movable in an axial direction. A sliding recess 110 is formed at an exterior circumference of the sleeve 102, and the sleeve 102 can move to the left or the right in the drawing by a shift fork (not shown) inserted in the sliding recess 110.

Each blocking key 104 is disposed in the plurality of recesses formed at the external circumference of the clutch hub 100 along the circumferential direction thereof with the even distances. A spring 112 is interposed between the blocking key 104 and the clutch hub 100, and the blocking key 104 is inserted in a locking groove 114 formed at an interior circumference of the sleeve 102 by elastic force of the spring 112.

The blocker ring 106 is typically called a synchronizer ring. The blocker ring 106 is disposed at both sides of the clutch hub 100 so as to protect the blocking key 104 and is adapted to be pushed by the sleeve 102 when the sleeve 102 moves in the axial direction so as to be frictionally synchronized with a cone surface 116 of the clutch gear 108.

The clutch gear 108 is integrally formed with a speed gear (not shown).

According to the synchronizing device, if the sleeve 102 is moved to the left or to the right in the drawing for shifting, the blocking key 104 as well as the sleeve 102 moves and pushes the blocker ring 106 to the clutch gear 108.

Then, an interior circumference of the blocker ring 106 is rubbed with the cone surface 116 of the clutch gear 108 such that rotation speeds of the clutch gear 108 and the blocker ring 106 are synchronized. If the sleeve 102 moves further at this state, the sleeve 102 and the clutch gear 108 are engaged with each other and power delivery is achieved.

FIG. 2 and FIG. 3 are a front view and a top plan view of a blocker ring used in a conventional synchronizing device.

Referring to FIG. 2 and FIG. 3, three servo load exerted portions 118 and three key load exerted portions 120 are formed at an exterior circumference of a conventional blocker ring 106 alternately.

The servo load exerted portion 118 represents a portion of the blocker ring 106 where supporting protrusions 122 and 124 for receiving the blocking key 104 are formed, and the key load exerted portion 120 represents a portion of the blocker ring 106 where a side of the blocking key 104 is contacted.

When the blocker rings 106 are disposed at the both sides of the clutch hub 100, the servo load exerted portion 118 of the blocker ring 106 disposed at one side and the key load exerted portion (not shown in the drawing) of the blocker ring (not shown in the drawing) disposed at the other side are disposed collinearly and the blocking key 104 is coupled therebetween.

Therefore, six blocking keys 104 disposed between the servo load exerted portion 118 and the key load exerted portion 120 pushes the blocker ring 106 disposed at the selected side, and thereby operates as the synchronizing device.

According to the conventional blocker ring 106, the key contacting surfaces 126 and 128 of the servo load exerted portion 118 and the key load exerted portion 120 are disposed on the same plane.

FIG. 4 is a schematic diagram of a conventional synchronizing device with a sleeve not being assembled for showing positions of a key and a blocker ring at a neutral state, and FIG. 5 is a schematic diagram of a conventional synchronizing device with a sleeve being assembled for showing positions of a key and a blocker ring at a start region of synchronization.

Referring to FIG. 4, a clearance C between the key contacting surface 126 of the servo load exerted portion 118 and the blocking key 104 is the same as that C between the key contacting surface 128 of the key load exerted portion 120 and the blocking key 104.

If the sleeve (not shown in the drawing) pushes the blocking key 104 in order to start synchronization, the blocking key 104 are simultaneously contacted to the key contacting surfaces 126 and 128 of the servo load exerted portion 118 and the key load exerted portion 120 as shown in FIG. 5, and synchronizing force is delivered.

Therefore, a time for eliminating an oil film remaining between the cone surface 116 of the clutch gear 108 and the blocker ring 106 may be insufficient and necessary frictional force may not be generated.

Even though the necessary frictional force is not secured as described above, serious problems may not occur in a normal shifting. However, synchronization is hard to be performed and smooth shifting may not be achieved in abrupt shifting.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a synchronizing device for a transmission having advantages of performing synchronizing action smoothly by eliminating an oil film from a blocker ring and a cone surface of a clutch gear during only key load is exerted when synchronizing.

In an aspect of the present invention, a synchronizing device for a transmission may include a clutch hub splined on a rotation shaft, a sleeve engaged to an external circumferential portion of the clutch hub by interposing a blocking key therebetween, the sleeve being movable axially in an axis of the rotation shaft, a clutch gear having a cone surface and disposed at both sides of the sleeve without an interference with the rotation shaft, and a blocker ring disposed between the clutch hub and the clutch gear and frictionally engaged to the cone surface of the clutch gear, wherein the blocker ring may include a servo load exerted portion and a key load exerted portion disposed alternately in a circumferential direction of the blocker ring and respectively having a key contacting surface, and the key contacting surface of the servo load exerted portion is disposed axially apart from the key contacting surface of the key load exerted portion by a predetermined distance.

The key contacting surface of the servo load exerted portion is positioned axially interior to that of the key load exerted portion.

A plurality of key guide grooves is formed at an exterior circumference of the clutch hub, and the blocking key is slidably disposed in the key guide grooves.

The key guide grooves may have a wider width portion and a narrower width portion.

The key guide grooves may include first and second key guide grooves disposed alternately, and the wider width portion of the first key guide groove faces toward one side and the wider width portion of the second key guide groove faces toward the other side.

A wider width portion of the key guide groove corresponding to the servo load exerted portion faces the key contacting surface of the servo load exerted portion.

The key contacting surface of the servo load exerted portion is formed between supporting protrusions protruding from the blocking ring toward the clutch hub, and a blocking key is slidably disposed between the supporting protrusions.

A narrower width portion of the key guide groove corresponding to the key load exerted portion faces the key contacting surface of the key load exerted portion, wherein the key contacting surface of the key load exerted portion is formed on a surface of a protruding portion protruding in a radial direction of the blocking ring and slidably engagable to the narrower width portion of the key guide groove corresponding to the key load exerted portion.

The key contacting surface of the servo load exerted portion is formed between supporting protrusions protruding from the blocking ring toward the clutch hub.

The key contacting surface of the key load exerted portion is formed on a surface of a protruding portion protruding in a radial direction of the blocking ring.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
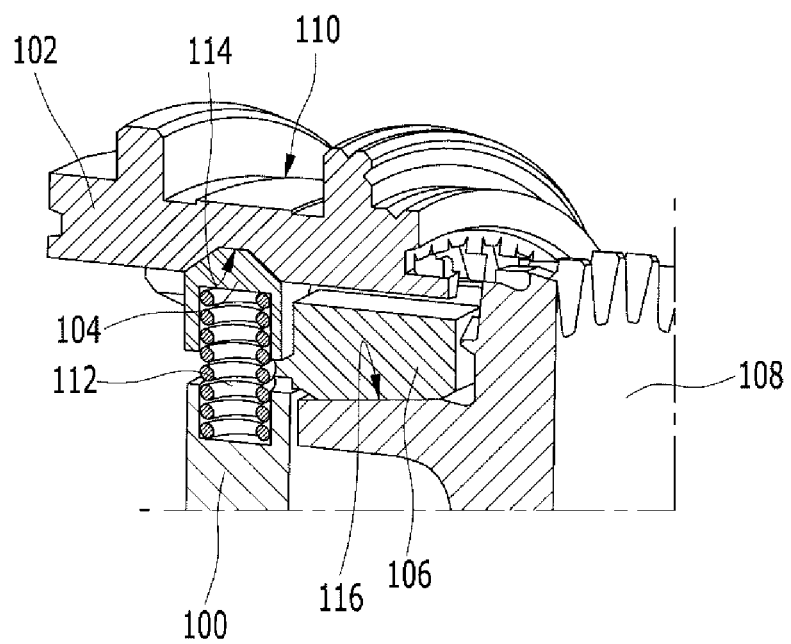
FIG. 1 is a partial cross-sectional view of a conventional synchronizing device.
Figure 2:
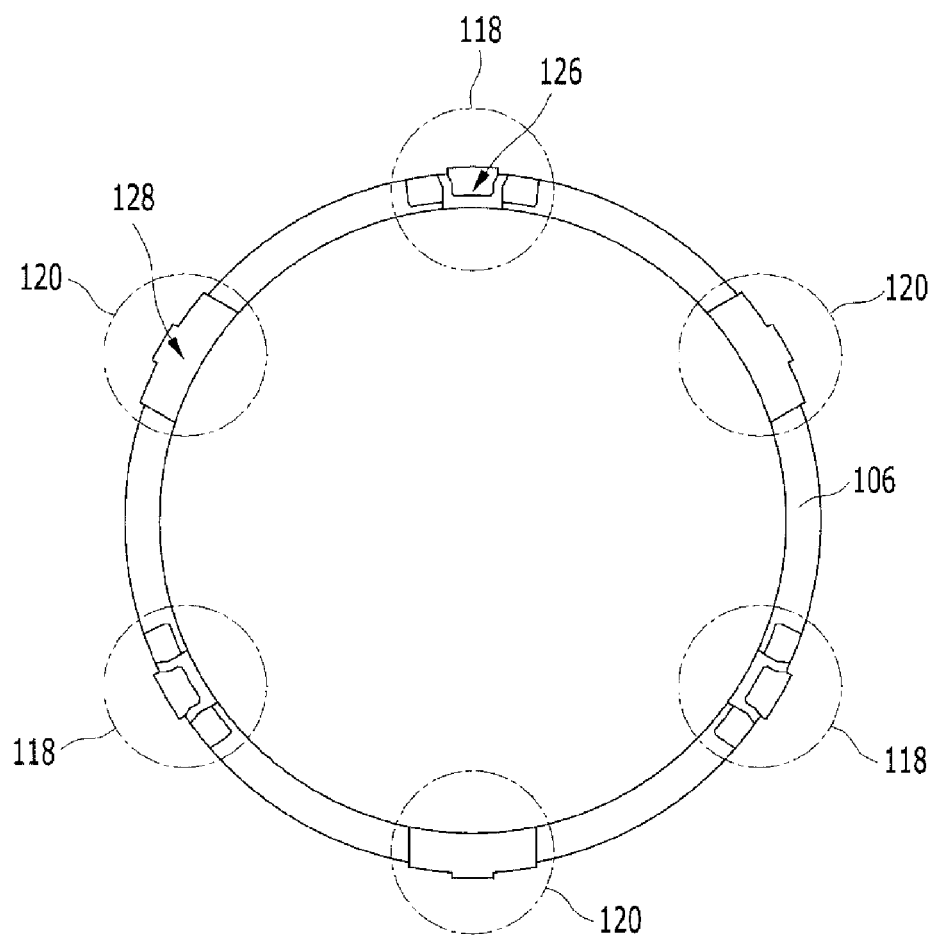
FIG. 2 is a front view of a blocker ring used in a conventional synchronizing device.
Figure 3:
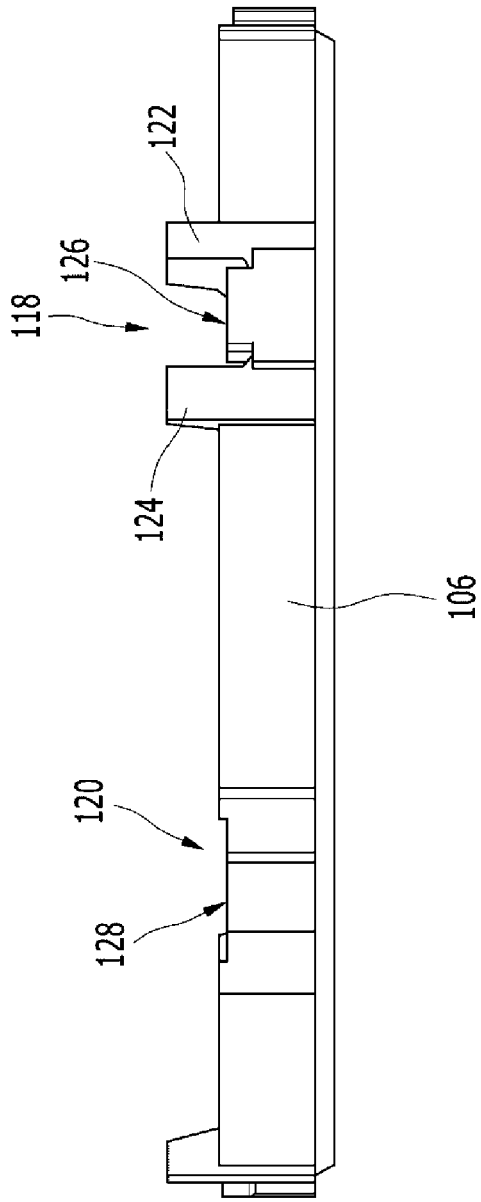
FIG. 3 is a top plan view of a blocker ring used in a conventional synchronizing device.
Figure 4:
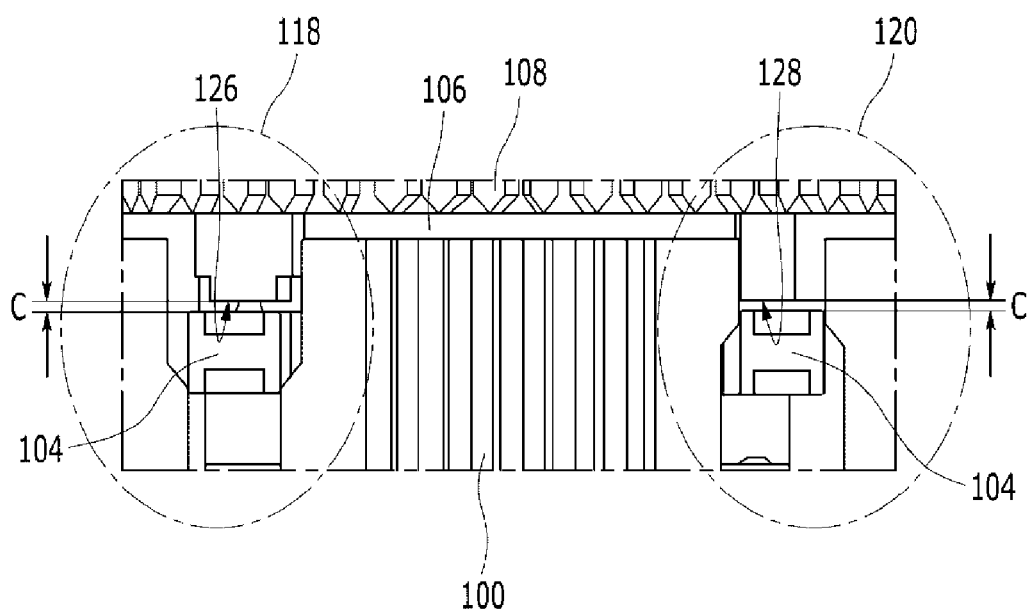
FIG. 4 is a schematic diagram of a conventional synchronizing device with a sleeve not being assembled for showing positions of a key and a blocker ring at a neutral state.
Figure 5:
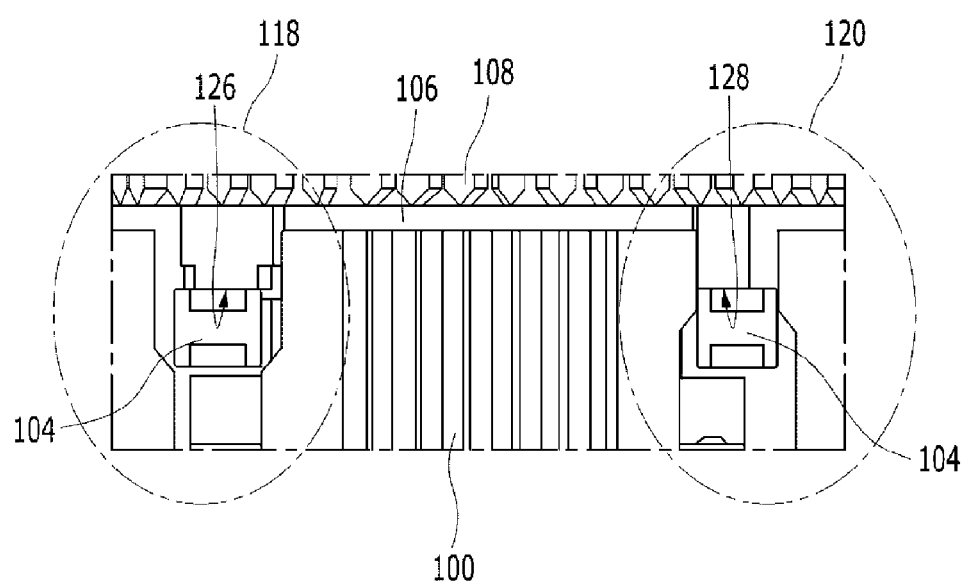
FIG. 5 is a schematic diagram of a conventional synchronizing device with a sleeve being assembled for showing positions of a key and a blocker ring at a start region of synchronization.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Description of components that are not necessary for explaining the present invention will be omitted, and the same constituent elements are denoted by the same reference numerals in this specification.

Figure 6:
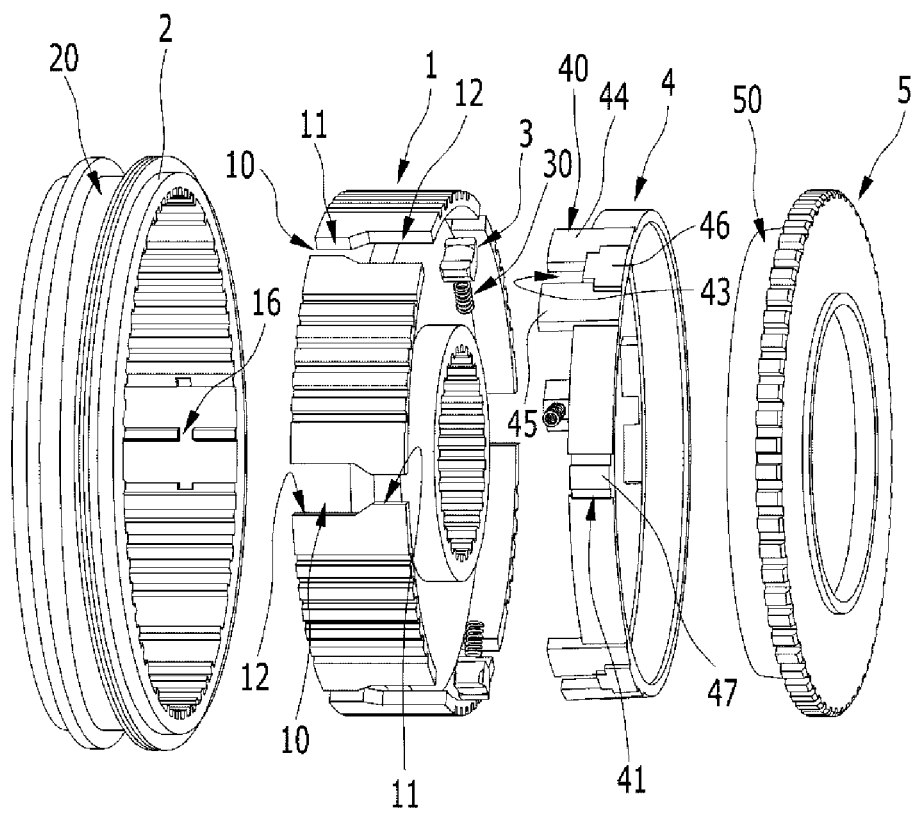
FIG. 6 is an exploded perspective view of a synchronizing device according to an exemplary embodiment of the present invention.
Figure 7:
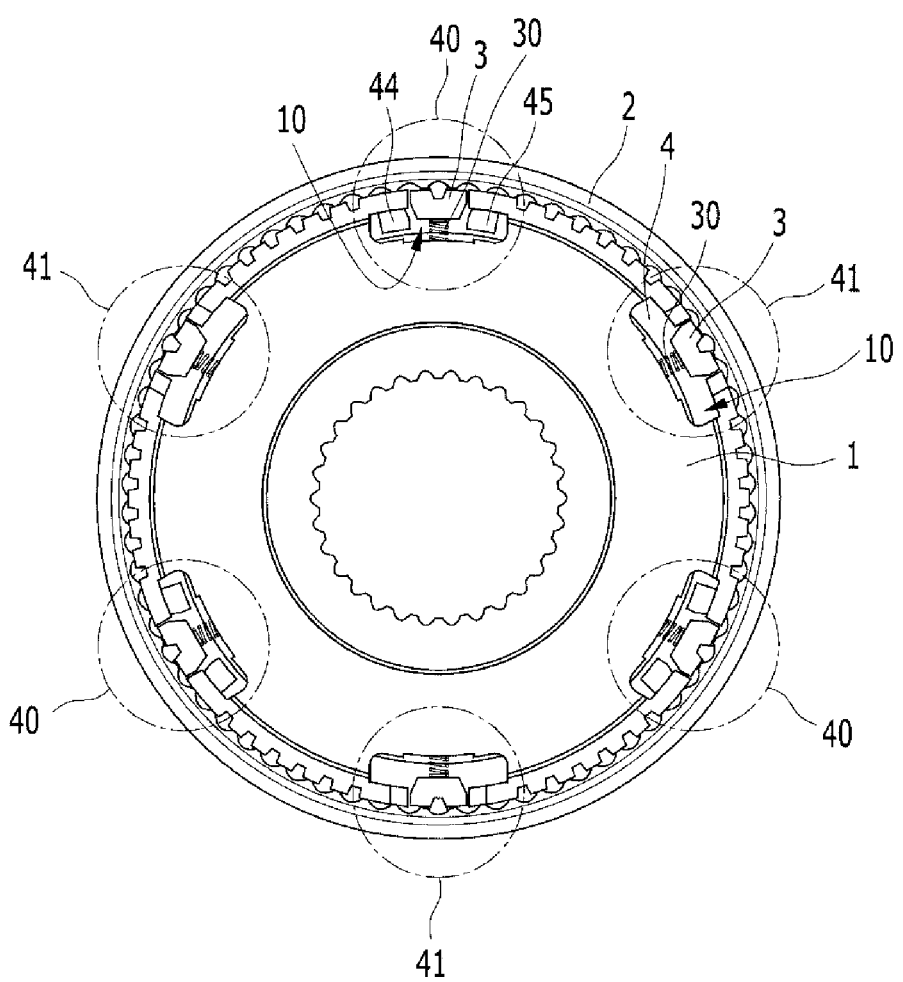
FIG. 7 is a front view of a synchronizing device according to an exemplary embodiment of the present invention.

FIG. 6 is an exploded perspective view of a synchronizing device according to an exemplary embodiment of the present invention, and FIG. 7 is a front view of a synchronizing device according to an exemplary embodiment of the present invention.

Referring to FIG. 6 and FIG. 7, a synchronizing device according to an exemplary embodiment of the present invention includes a clutch hub 1, a sleeve 2, a blocking key 3, a blocker ring 4, and a clutch gear 5.

The clutch hub 1 is splined on a rotation shaft and a plurality of key guide grooves 10 is formed at an exterior circumference of the clutch hub 1 along a circumferential direction thereof with even distances.

The sleeve 2 is splined to an exterior circumference of the clutch hub 1 so as to be movable to an axial direction, and a sliding recess 20 is formed circumferentially at an exterior circumference of the sleeve 2. A shift fork is inserted in the sliding recess 20 of the sleeve 2 such that the sleeve 2 moves in the axial direction according to a movement of the shift fork.

The blocking keys 3 are disposed in the plurality of key guide grooves 10 formed at the exterior circumference of the clutch hub 1 along a circumferential direction with even distances. In addition, a spring 30 is interposed between the clutch hub 1 and the blocking key 3.

That is, the blocking key 3 is inserted in a locking groove 16 formed at an interior circumference of the sleeve 2 by elastic force of the spring 30.

The blocker ring 4 is typically called a synchronizer ring. The blocker ring 4 is disposed at both sides of the clutch hub 1 so as to protect the blocking key 3 and is adapted to be pushed by the sleeve 2 in an axial direction when the sleeve 2 moves in the axial direction so as to be frictionally synchronized with a cone surface 50 of the clutch gear 5.

The clutch gear 5 is integrally combined with a speed gear.

Structure of the synchronizing device will be described in further detail.

The key guide groove 10 formed at the clutch hub 1 includes a narrower width portion 11 having a narrower width and a wider width portion 12 having a wider width, and the narrower width portion 11 and the wider width portion 12 are connected by a slanted surface.

In addition, six key guide grooves 10 are formed with even distances. The wider width portions 12 of three key guide grooves 10 face toward one side, and the wider width portions 12 of the other three key guide grooves 10 face toward the other side. In addition, the three key guide grooves 10 and the other three key guide grooves 10 are disposed alternately. That is, the key guide groove (the second key guide groove) 10 having the wider width portion 12 facing toward the other side is disposed next to the key guide groove (the first key guide groove) 10 having the wider width portion 12 facing toward the one side.

The blocking key 3 is disposed in each key guide groove 10. Only three blocking keys 3 disposed in the wider width portions 12 facing toward the one side are shown in the drawing, but the remaining three blocking keys 3 are also disposed in the wider width portions 12 facing toward the other side.

Meanwhile, a servo load exerted portion 40 is formed at an exterior circumference of the blocker ring 4 collinearly with the wider width portion 12 of the key guide groove 10, and a key load exerted portion 41 is formed at the exterior circumference of the blocker ring 4 between the servo load exerted portions 40 collinearly with the narrower width portion 11 of the key guide groove 10.

The servo load exerted portion 40 includes a space 43, supporting protrusions 44 and 45, and a protruding portion 46. The supporting protrusions 44 and 45 are protruded in the axial direction at both sides of the space 43. A width of the space 43 is wide enough to receive a width of the blocking key 3.

In addition, the protruding portion 46 is formed at an exterior circumference of the blocker ring 4 between the supporting protrusions 44 and 45 so as to be inserted in the key guide groove 10 without interference.

A protruding portion 47 is also formed at the key load exerted portion 41 so as to be inserted in the narrower width portion 11 of the key guide groove 10 without interference.

The synchronizing device is assembled as shown in FIG. 7 and performs synchronizing action. The synchronizing action of the synchronizing device is well known to a person of an ordinary skill in the art, and thus detailed description thereof will be omitted in this specification.

Figure 8:
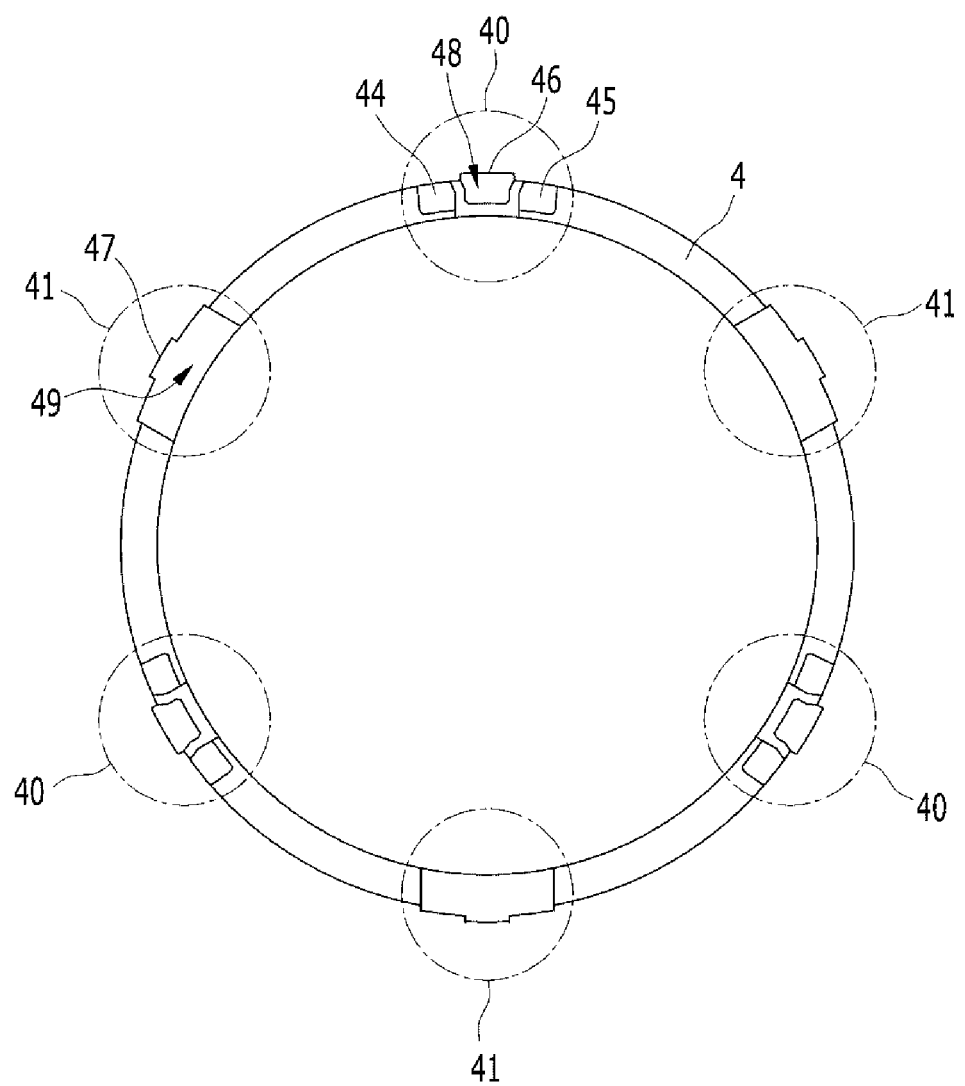
FIG. 8 is a front view of a blocker ring used in a synchronizing device according to an exemplary embodiment of the present invention.
Figure 9:
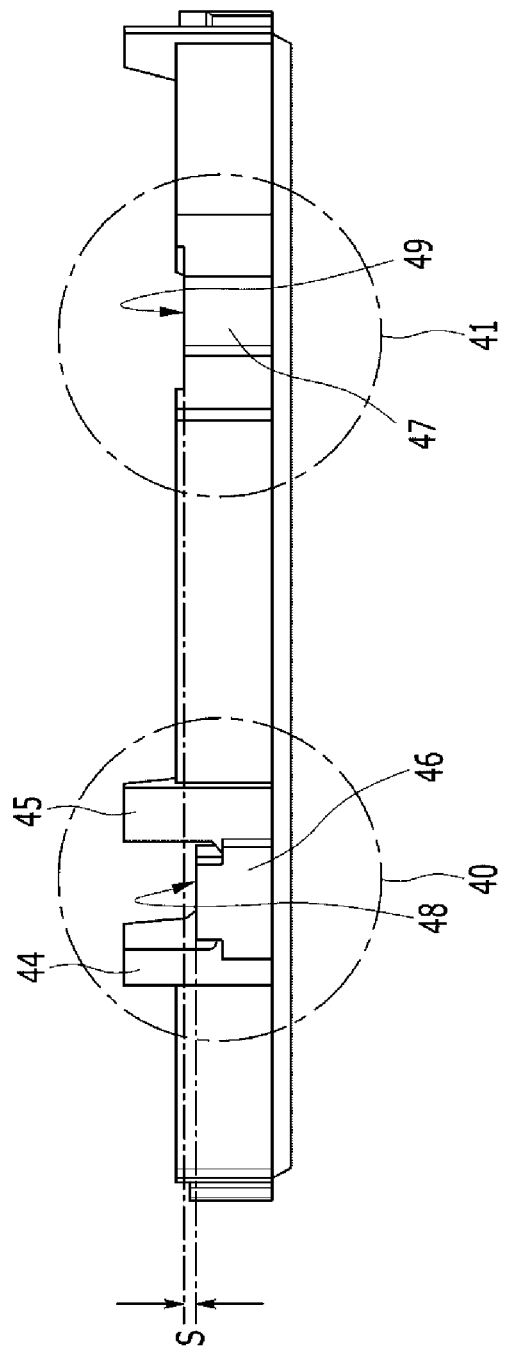
FIG. 9 is a top plan view of a blocker ring used in a synchronizing device according to an exemplary embodiment of the present invention.

FIG. 8 and FIG. 9 are a front view and a top plan view of a blocker ring used in a synchronizing device according to an exemplary embodiment of the present invention.

Referring to FIG. 8 and FIG. 9, three servo load exerted portions 40 and three key load exerted portions 41 are formed alternately at the exterior circumference of the blocker ring 4 according to an exemplary embodiment of the present invention.

In addition, a key contacting surface 48 of the servo load exerted portion 40 is positioned apart from a key contacting surface 49 of the key load exerted portion 41 axially by a predetermined distance S.

That is, the key contacting surface 48 of the servo load exerted portion 40 is positioned axially interior (i.e., lower or deeper in FIG. 9) to that 49 of the key load exerted portion 41.

Figure 10:
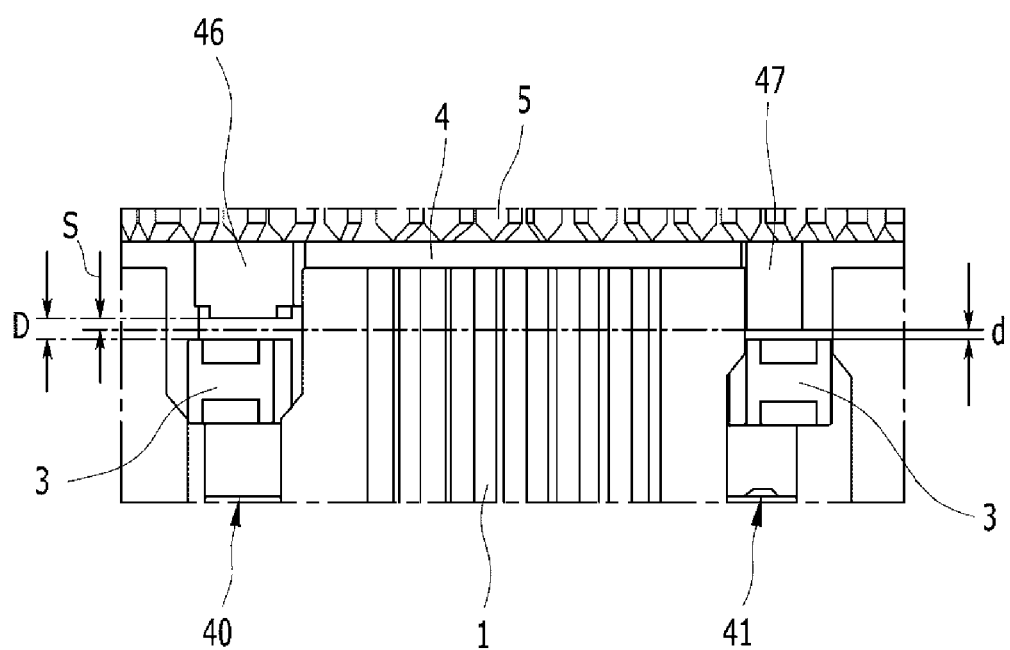
FIG. 10 is a schematic diagram of a synchronizing device according to an exemplary embodiment of the present invention with a sleeve not being assembled for showing positions of a blocker ring and a key at a neutral state.
Figure 11:
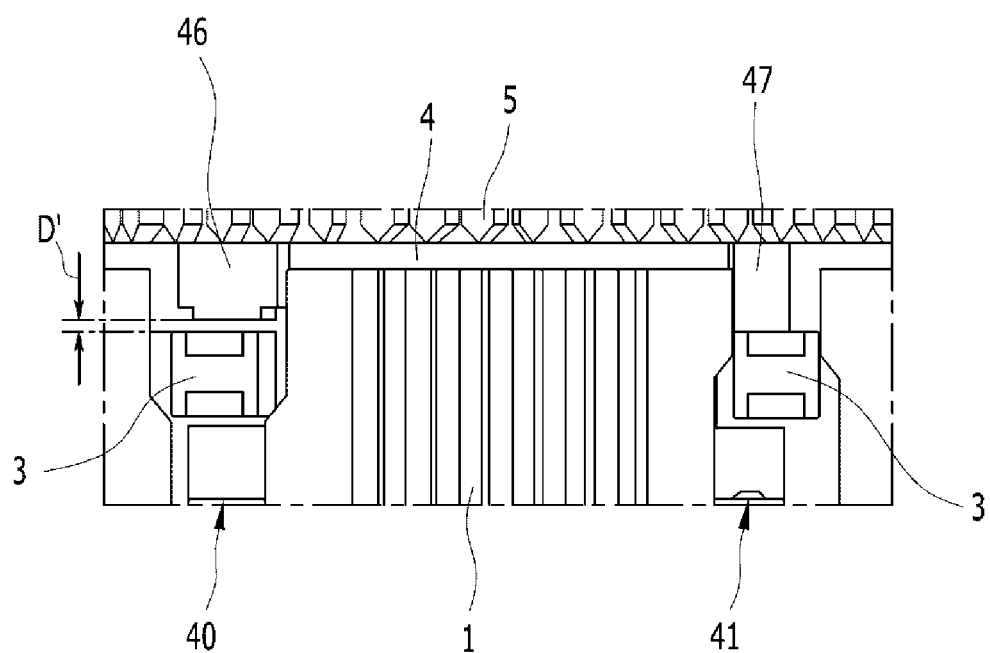
FIG. 11 is a schematic diagram of a synchronizing device according to an exemplary embodiment of the present invention with a sleeve being assembled for showing positions of a blocker ring and a key at a start region of synchronization.

FIG. 10 is a schematic diagram of a synchronizing device according to an exemplary embodiment of the present invention with a sleeve not being assembled for showing positions of a blocker ring and a key at a neutral state, and FIG. 11 is a schematic diagram of a synchronizing device according to an exemplary embodiment of the present invention with a sleeve being assembled for showing positions of a blocker ring and a key at a start region of synchronization.

Referring to FIG. 10, a length D between the key contacting surface 48 of the servo load exerted portion 40 and the blocking key 3 is longer than that d between the key contacting surface 49 of the key load exerted portion 41 and the blocking key 3 by the predetermined distance S at a neutral state.

If the sleeve (not shown in the drawing) pushes the blocking key 3 in order to start the synchronizing action, the blocking key 3 is firstly contacted with the key contacting surface 49 of the key load exerted portion 41 and pushes the blocker ring 4 as shown in FIG. 11.

At this time, the blocking key 3 positioned near the servo load exerted portion 40 is spaced from the key contacting surface 48 by a length D'.

If the sleeve further moves in the axial direction at this state, oil wiping is achieved between the blocker ring 4 and the cone surface 50 of the clutch gear 5 by key load of the key load exerted portion 41 during the sleeve moves to the axial direction by the length D'. Therefore, oil film remaining between the blocker ring 4 and the cone surface 50 is eliminated.

That is the blocker ring 4 is moved by load of the blocking key 3 disposed in the key load exerted portion 41 such that oil wiping is achieved during synchronizing. After that, the blocker ring 4 is moved by load of the blocking key 3 disposed in the servo load exerted portion 40 such that the synchronizing action is completed.

Since a proximity region being an oil wiping region is sufficiently secured according to an exemplary embodiment of the present invention, frictional force may be sufficiently secured during synchronizing.

Therefore, smooth shifting may be achieved by stable synchronizing action in a case of abrupt shifting as well as normal shifting.

According to an exemplary embodiment of the present invention, the blocker ring is moved by load of the blocking key disposed in the key load exerted portion such that oil wiping is achieved during synchronizing. After that, the blocker ring is moved by load of the blocking key disposed in the servo load exerted portion such that the synchronizing action is completed. Therefore, further stable synchronizing action may be achieved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A synchronizing device for a transmission comprising:
   a clutch hub splined on a rotation shaft and having a plurality of key guide grooves formed at an exterior circumference thereof;
   a sleeve engaged to an external circumferential portion of the clutch hub by interposing a blocking key therebetween, the sleeve being movable axially in an axis of the rotation shaft and the blocking key being slidably disposed in the key guide grooves in an axial direction of the clutch hub;
   a clutch gear having a cone surface and disposed at both sides of the sleeve without an interference with the rotation shaft; and
   a blocker ring disposed between the clutch hub and the clutch gear and frictionally engaged to the cone surface of the clutch gear;
   wherein each of the key guide grooves has a wider width portion and a narrower width portion extending from a circumferential edge of the clutch hub along an axial direction of the clutch hub, the wider width portion and the narrower width portion being positioned in opposite directions from each other along the axial direction of the clutch hub;
   wherein the key guide grooves include first and second key guide grooves disposed alternately along a circumferential direction of the clutch hub, the wider width portion of the first key guide groove faces toward one side and the wider width portion of the second key guide groove faces toward the other side, and the wider width portion of the first guide groove and the narrower width portion of the second guide portion are disposed alternatively along the circumferential edge of the clutch hub; and
   wherein the blocker ring includes a servo load exerted portion axially facing the wider width portion of the first key guide groove and a key load exerted portion axially facing the narrower width portion of the second key groove and disposed alternately in a circumferential direction of the blocker ring, each of the servo load exerted portion and the key load exerted portion respectively has a key contacting surface, and the key contacting surface of the servo load exerted portion is disposed axially apart from the key contacting surface of the key load exerted portion by a predetermined distance.

2. The synchronizing device of claim 1, wherein the key contacting surface of the servo load exerted portion is positioned axially interior to that of the key load exerted portion.

3. The synchronizing device of claim 1, wherein a plurality of key guide grooves is formed at an exterior circumference of the clutch hub.

4. The synchronizing device of claim 1, wherein the wider width portion in the each of the key guide grooves corresponding to the servo load exerted portion faces the key contacting surface of the servo load exerted portion.

5. The synchronizing device of claim 4,
   wherein the key contacting surface of the servo load exerted portion is formed between supporting protrusions protruding from the blocking ring toward the clutch hub; and
   wherein a blocking key is slidably disposed between the supporting protrusions.

6. The synchronizing device of claim 1, wherein the narrower width portion in the each of the key guide grooves corresponding to the key load exerted portion faces the key contacting surface of the key load exerted portion.

7. The synchronizing device of claim 6, wherein the key contacting surface of the key load exerted portion is formed on a surface of a protruding portion protruding in a radial direction of the blocking ring and slidably engagable to the narrower width portion of the key guide groove corresponding to the key load exerted portion.

8. The synchronizing device of claim 1, wherein the key contacting surface of the servo load exerted portion is formed between supporting protrusions protruding from the blocking ring toward the clutch hub.

9. The synchronizing device of claim 1, wherein the key contacting surface of the key load exerted portion is formed on a surface of a protruding portion protruding in a radial direction of the blocking ring.

* * * * *